United States Patent [19]

Soo Hoo

[11] 4,133,402

[45] Jan. 9, 1979

[54] TWO WHEEL MOTORIZED VEHICLE SIDE WHEEL OUTRIGGER ASSEMBLY

[76] Inventor: Wayne Soo Hoo, 4861 N. Paulina, Chicago, Ill. 60640

[21] Appl. No.: 832,317

[22] Filed: Sep. 12, 1977

[51] Int. Cl.² .............................................. B62D 1/12
[52] U.S. Cl. .................. 180/30; 280/112 A; 280/293; 280/714
[58] Field of Search .............................. 180/30, 32, 21; 280/6 H, 6.1, 6.11, 43.23, 293, 709, 112 A, 714

[56] References Cited

U.S. PATENT DOCUMENTS

| Re. 18,424 | 4/1932 | Hess | 280/293 |
|---|---|---|---|
| 2,960,351 | 11/1960 | Jeffress | 280/293 |
| 3,191,954 | 6/1965 | Schuetz | 280/43.23 X |
| 3,236,323 | 2/1966 | Austin | 280/293 X |
| 3,410,357 | 11/1968 | Summers | 180/30 |
| 3,610,646 | 10/1971 | Bobard et al. | 280/6 H |
| 3,842,926 | 10/1974 | Williams et al. | 280/6 H |
| 3,980,150 | 9/1976 | Gigli | 280/293 |

FOREIGN PATENT DOCUMENTS 570196  3/1959  Canada .................. 280/6 H

Primary Examiner—Kenneth H. Betts
Attorney, Agent, or Firm—Bernard L. Kleinke

[57] ABSTRACT

A side wheel outrigger assembly for each side of a motorcycle, includes an arm pivotally connected to a mounting plate which in turn is attached rigidly to the frame of the vehicle. A strut is fixed to the arm and extends outwardly and rearwardly therefrom for supporting rotatably a wheel mounted at the outer end thereof. A piston cylinder assembly has a piston rod pivotally connected to the arm for latching releasably the arm to connect rigidly and releasably and the wheel in position for adding stability to the vehicle. A bypass conduit connects the interiors of the cylinder housing between the opposite sides of the piston head for enabling the piston head to move within the cylinder during normal operation of the vehicle to permit in turn the wheel to follow freely the contours of the ground and to absorb impacts encountered by the wheel. A valve is connected in fluid communication with the conduit for interrupting selectively the fluid communication between opposite sides of the cylinder assembly to prevent the wheel and its strut from moving relative to the mounting plate, thereby rendering the side wheel assembly to become rigid. The side wheel assemblies are adapted to fold upwardly and inwardly when not in use.

10 Claims, 5 Drawing Figures

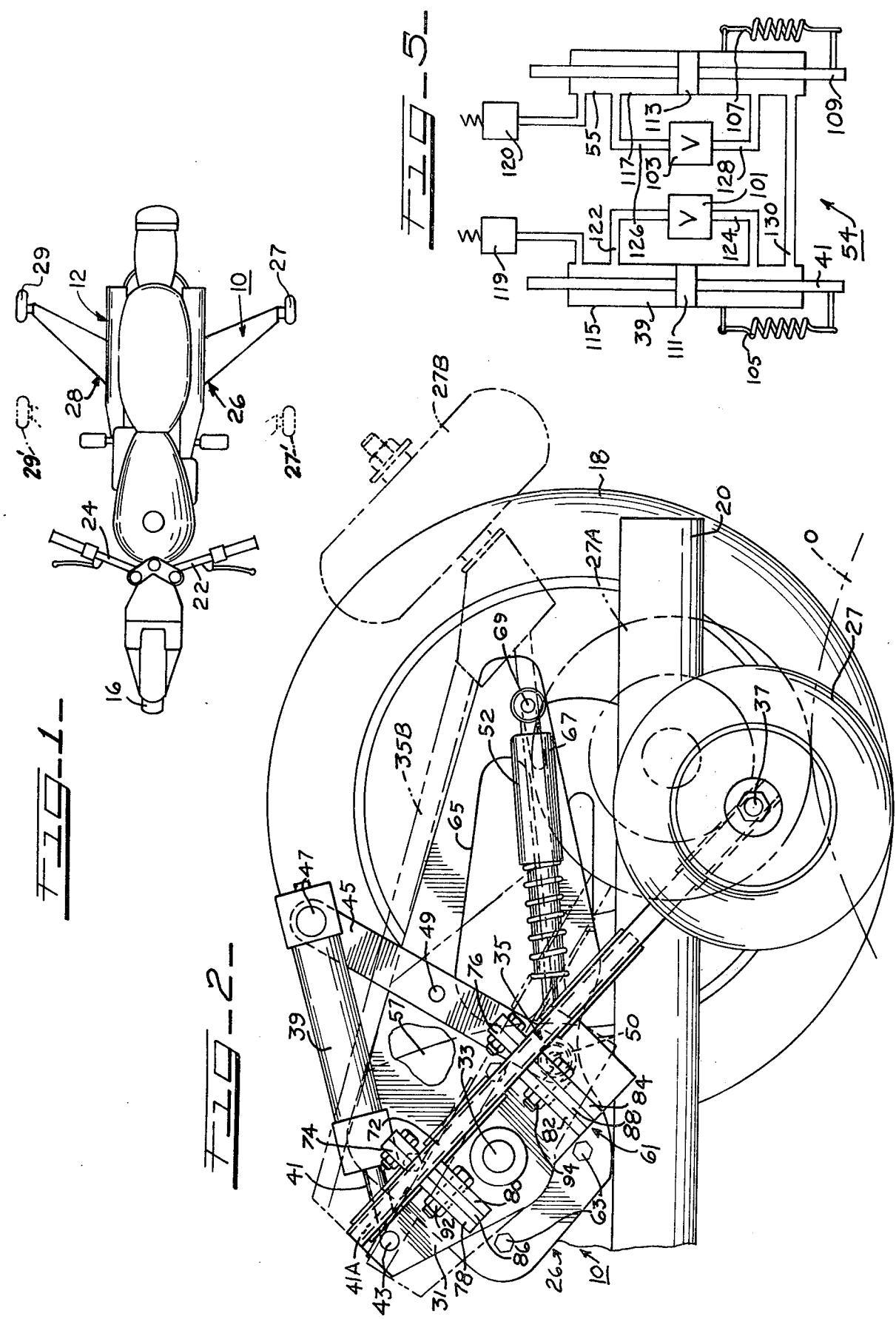

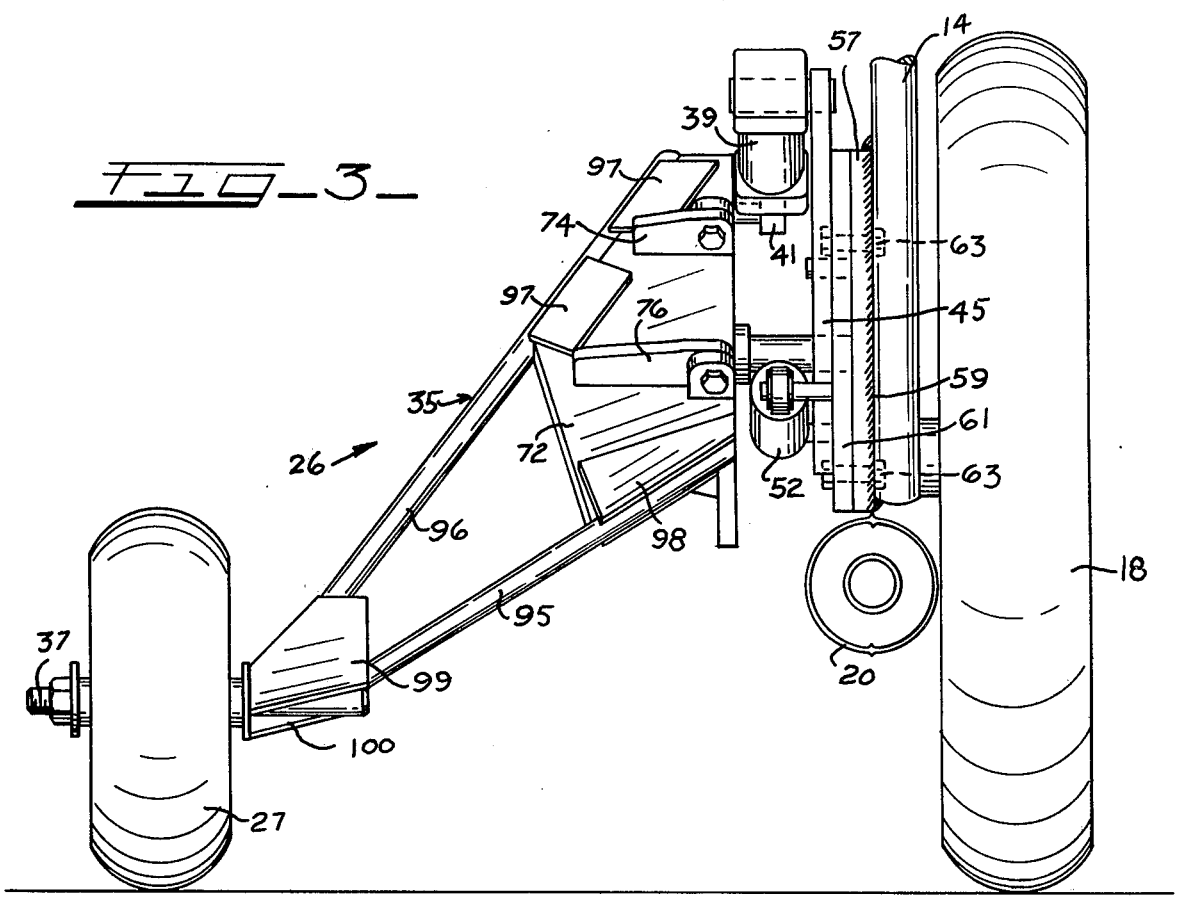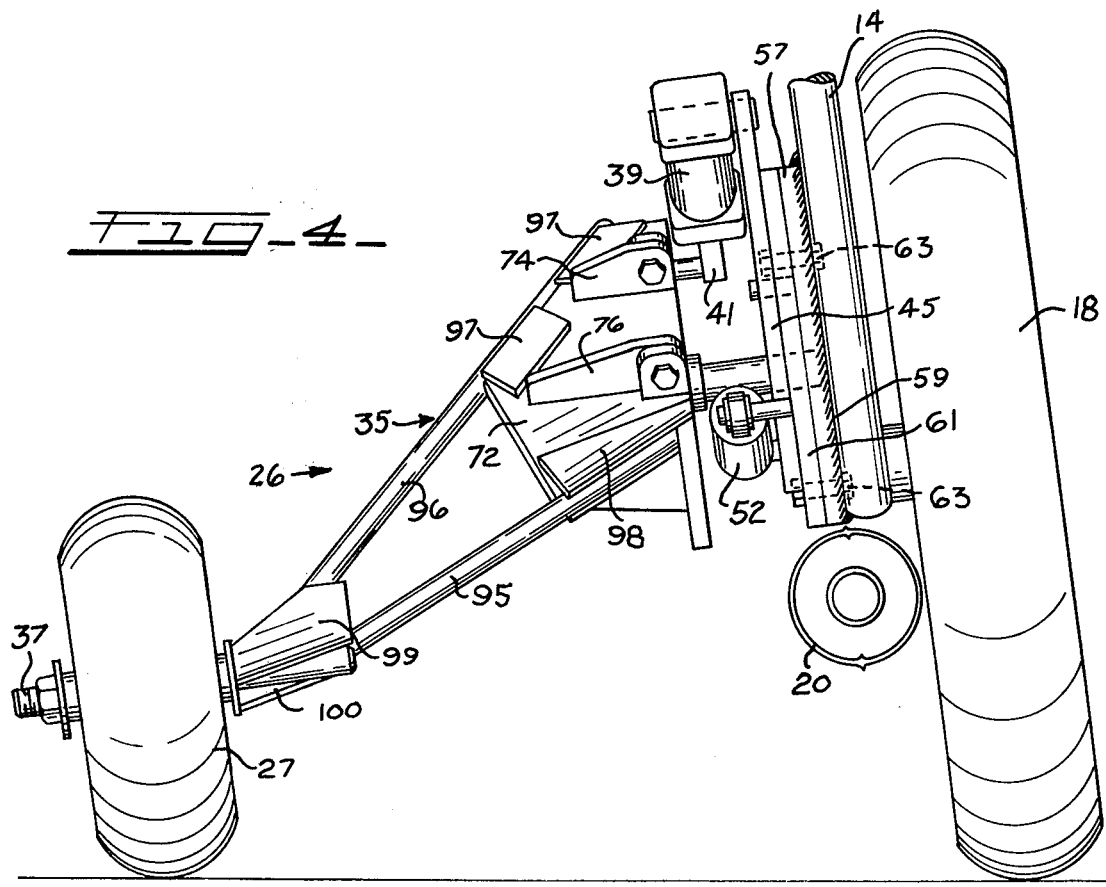

TWO WHEEL MOTORIZED VEHICLE SIDE WHEEL OUTRIGGER ASSEMBLY

The present invention relates in general to a side wheel outrigger assembly for two wheel motorized vehicles, and more particularly relates to a pair of outrigger side wheels which are adapted to be fixed to a vehicle having two main in-line wheels for added stability during use.

There have been a few attempts at adding side wheel structures to two-wheel motorized vehicles, such as motorcycles, for added stability. In this regard, reference may be made to U.S. Pat. Nos. Re. 18,424; 3,236,323 and 3,980,150. However, such side wheel assemblies have not been entirely satisfactory for some applications. In this regard, the assemblies shown in the Pat. Nos. 3,236,323 and 3,980,150 are in the form of undercarriages as opposed to outrigger wheels, and thus they are only suitable for very low speeds and standstill operation. The side wheels disclosed in U.S. Pat. No. Re. 18,424 do extend outwardly from the two-wheeled vehicle, but they are not at all suitable for high speed operation of the vehicle. In this regard, the auxiliary side wheels and their supporting structure would not at all be suitable for high speed operation, since in a situation were the auxiliary side wheels encounter obstacles along the ground, the wheels and their supporting structures would sustain substantial impacts which would in turn be transmitted directly to the frame of the vehicle. Thus, it would be highly desirable to have a side wheel outrigger assembly which could be readily attached to different types of kinds of existing two-wheel vehicles, and which could be used at high speeds without danger of severe impacts during use of the vehicle. Such as side wheel outrigger assembly should be able to provide for stability of the vehicle especially when it leans into turns a high speeds. Moreover, such a side wheel outrigger assembly should be relatively inexpensive to manufacture, and relatively uncomplicated to install. Moreover, such an outrigger assembly should be readily and conveniently adaptable to fold upwardly and inwardly out of use, if that is desired. Moreover, the outrigger assembly should be esthetically attractive and it should enable the auxiliary side wheels to be positioned in relatively close proximity to the frame of the vehicle so that the overall width of the vehicle is not prohibitively great so that the vehicle employing the outrigger assembly could be used in heavy traffic situations.

Therefore, the principal object of the present invention is to provide a new and improved side wheel outrigger assembly, which is adapted to be mounted to new or existing two-wheel motorized vehicles, and which can be used at high speeds without undue risk of severe impacts to the outrigger assembly or the frame of the vehicle.

Another object of the present invention is to provide such a new and improved side wheel outrigger assembly, which is relatively inexpensive to manufacture and easy to install, and which is esthetically attractive and able to fold upwardly and inwardly for convenience when the outrigger wheels are not to be used.

Briefly, the above and further objects of the present invention are realized by providing a new and improved side wheel outrigger assembly, which includes a pair of right and left arms pivotally connected to the respective right and left mounting plates, which in turn are adapted to be attached rigidly to opposite sides of the vehicle frame. A pair of right and left struts are fixed to the respective ones of the arms and extend outwardly and rearwardly therefrom to support rotatably a pair of right and left wheels, respectively. A pair of right and left piston cylinder assemblies have their respective piston rods pivotally connected to the respective arms for latching releasably the arms to connect rigidly and releasably the struts and the wheels in position. A pair of right and left by-pass conduits connect in fluid communication the interior of the right and left cylinder assemblies, respectively, between the opposite sides of their piston heads for enabling the piston heads to move within the cylinder assemblies during normal operation of the vehicle to permit in turn the right and left wheels to follow freely the contours of the ground over which the vehicle is moving and to absorb impacts encountered by the wheels. Valves are connected in fluid communication with the by-pass conduits for interrupting selectively the fluid communication between opposite sides of the selected one of the right and left cylinder assemblies to prevent the selected arm from moving and for preventing in turn its wheel and its strut from moving relative to the mounting plates, thereby providing additional stability to the vehicle. Shock absorbers are connected through transversely extending links to the arms to absorb impacts when the arm are locked in position, as well as during the normal operation of the vehicle. The side wheel assemblies of the present invention are adapted to fold upwardly and inwardly when it is desired not to use them.

These and further objects of the present invention and corresponding features and accomplishments are obtained by means of the embodiment of the present invention illustrated in the accompanying drawings, wherein: strut FIG. 1 is a plan elevational view of a side wheel outrigger assembly, which is constructed in accordance with the present invention and which is shown attached to a motorized two-wheel vehicle;

FIG. 2 is a greatly enlarged side elevational view on the left portion of the side wheel assembly of FIG. 1 of the drawings;

FIG. 3 is a rear elevational view in enlarged scale of the left side of the side wheel outrigger assembly of FIG. 2 of the drawings;

FIG. 4 is a view of the left side of the side wheel assembly of FIG. 3 showing the vehicle leaning to the left; and FIG. 5 is a schematic view of the hydraulic system for the side wheel outrigger assembly of FIG. 1 of the drawings.

Referring now to the drawings, and more particularly to FIGS. 1 and 2 thereof, there is shown a side wheel outrigger assembly 10, which is constructed in accordance with the present invention and which is shown mounted on a two wheel motorized vehicle 12 in the form of a motorcycle. The vehicle 12, as best seen in FIG. 3 of the drawings, includes a frame 14 supported rollably by a front wheel 16 (FIG. 1) and a rear wheel 18 (FIG. 2). The vehicle 12 is powered by an engine having an exhaust pipe 20. A pair of handlebars 22 and 24 are used in steering the vehicle. It should be understood that the vehicle 12 may be a conventional existing vehicle, such as a motorcycle, having the outrigger assembly 10 mounted thereon, or the vehicle 12 may be a new vehicle with the assembly 12 factory installed.

The side wheel outrigger assembly 10 generally comprises a left wheel sub-assembly 26 mounted on the left side of the vehicle 12 and having an auxiliary side wheel 27 positioned outwardly from the frame 14, and a right wheel sub-assembly 28 which is mounted on the right side of the vehicle 12 and which has an auxiliary side wheel 29 mounted outwardly from the frame 14 of the vehicle 12. Since the two wheel sub-assemblies are similar to one another, only the left wheel sub-assembly 26 will now be described in greater detail with particular reference to FIG. 2 of the drawings. The left wheel sub-assembly 26 includes a holder arm 31 pivotally mounted intermediate its ends at 33 and disposed in a backwardly inclined disposition in a vertical plane as hereinafter described in greater detail. A strut unit 35 is fixed to the lower rear end portion of the holder arm 31, and has the wheel 27 rotatably mounted on an axle 37 thereon, the axle 37 extending transversely to the vertical mid plane of the vehicle 12. A left piston cylinder assembly 39 has its piston rod 41 pivotally attached at 43 to the holder arm 31 at the upper end thereof opposite from its lower end which is fixed to the strut unit 35. A transversely extending link 45 pivots about its mid point at 49 and has it upper backwardly extending end portion pivotally attached at 47 to the left piston cylinder assembly, the lower forward end portion of the link 45 being pivotally attached at 50 to a shock absorber 52. As shown in FIG. 5 of the drawings, a hydraulic latching system 54 including the left piston cylinder assembly 39 and a right piston cylinder assembly 55 is used to lock the arms of the left and right wheel sub-assemblies 26 and 28 as hereinafter described in greater detail.

In use, the wheels 27 and 29 of the left and right wheel sub-assemblies 26 and 28, respectively, ordinarily engage the ground on opposite sides of the vehicle 12 as it moves along the ground. It should be understood that the side wheel outrigger assembly 10 of the present invention operates at all speeds of the vehicle 10, including standstill and high speed operation. As the vehicle 10 travels along the ground, the wheels 27 and 29 freely rotate about their axles and move up and down to follow the contour of the ground over which the vehicle 12 is traveling. As the wheels, such as the wheel 27, moves up and down to follow the contours of the ground, the arms, such as the arm 31, pivots about the pivot point 33. In this regard, the hydraulic latching system 54 including the piston cylinder assemblies, such as the assembly 39, permits the arm, such as the arm 31, to move freely about their pivot point. In this regard, as best seen in FIG. 2 of the drawings, should the auxiliary side wheel 27 encounter an obstacle O, the wheel 27 follows the contour of the obstacle 0, as shown in the phantom lines indicated with the reference characters followed by the letter A. For example, the side wheel 27 is designated as 27B in the phantom line showing.

When it is desired to utilize the side wheels for added stability, the hydraulic latching system 54 is activated to latch either one or both of the left and right side wheel sub-assemblies 26 and 28 for the purpose of preventing the desired ones of the holder arms, such as the holder arm 31, from moving. Such is the case where, for example, the vehicle 12 leans into a turn. In such a situation, the left wheel sub-assembly 26 assumes a position as shown in FIG. 4 of the drawings when the vehicle 12 leans into a left turn position. In this type of situation, the piston rod 41 moves extensively outwardly from the piston cylinder assembly 39 as best seen in FIG. 4 of the drawings. It should be noted that the front end portion of the piston rod 41 extends further outwardly in an axial direction as shown in FIG. 4 of the drawings as compared to the showing of the piston rod 41 in FIG. 3 of the drawings which illustrates the left wheel sub-assembly 26 in the normal upright configuration. When the vehicle 12 leans into a left turn, as shown in FIG. 4 of the drawings, the piston rod 41 moves outwardly extensively to enable the wheel 27 to follow the contour of the ground. Once the vehicle 12 moves into a disposition at the full extent of its lean, the driver can lock the hydraulic cylinder assembly 39 by means of the system 54 so that the entire left wheel sub-assembly 26 becomes rigid, whereby the wheel 27 engaging the ground, provides for stability and support for the vehicle 12 through the left wheel sub-assembly 26. Thus, as the vehicle 12 moves into a left turn, as shown in FIG. 4 of the drawings, the piston rod 41 initially moves extensively as indicated in FIG. 4 of the drawings. Thereafter, once the vehicle 12 is disposed in an leftwardly inclined orientation, as shown in FIG. 4 of the drawings, the hydraulic latching system 54 causes the piston rod 41 to be fixed in position so that the arm 31 remains fixed in its position, whereby the left wheel sub-assembly 26 then becomes rigid to provide the necessary stability for the vehicle 12. Once the vehicle 12 completes the left turn and starts to return to its initial upright position, the driver of the vehicle 12 can unlatch the hydraulic cylinder assembly 39 to permit the arm 31 and the piston rod 41 to return to their initial positions. In this regard, the piston rod 41 retracts back into the piston cylinder assembly 39 as indicated in FIGS. 2 and 3 of the drawings. It should be noted that, in both FIGS. 3 and 4 of the drawings, the side wheels, such as the side wheel 37, remains in a parallel disposition relative to the rear wheel 18 at all times, both during the normal upright position and the leaning position. Thus, as the vehicle 12 moves out of a left turn toward its initial upright position, with the left piston cylinder assembly 39 unlatched, the wheel 27 moves toward its vertical disposition to cause in turn the arm 31 to pivot about its pivot point 33 in a clockwise direction as viewed in FIG. 2 of the drawings. Thus, the piston rod 41 is moved by the arm 31 back into the piston cylinder assembly 39.

According to the present invention, as the vehicle 12 moves along the ground with the auxiliary side wheels 27 and 29 following the contours of the ground in a substantially free manner, the hydraulic latching system 54, as hereinafter described in greater detail, also serves the function of absorbing impacts from obstacles such as the obstacle O shown in phantom lines in FIG. 2 of the drawings. Additionally, the shock absorber 52 cushions the impact from obstacles that are encountered along the ground by the side wheels, such as the side wheel 27 transmitting the impact through the strut unit 35 to the holder arm 31 and from there back through the left piston cylinder assembly 39 and the link 45 to the shock absorber 52. As a result, impacts due to obstacles encountered along the ground are cushioned so that the frame 14 of the vehicle and the rider seated on the vehicle are protected from such impacts. Moreover, the side wheel sub-assemblies 26 and 28 are protected from such severe impacts, since they are cantonally out from the frame 14, or otherwise the sub-assemblies 26 and 28 could be damaged during use.

Also, according to the present invention, when the hydraulic latching system 54 latches either one or both of the left or right piston cylinder assemblies 39 and 55 to render either one or both of the sub-assemblies 26 and 28 rigid, the shock absorbers, such as the shock absorber 52, cushions any impacts encountered during such an operation.

Additionally, it should be noted that, with the side wheel outrigger assembly 10 of the present invention, the auxiliary side wheels 27 and 29 are spaced only a short distance outwardly from the vertical mid-plane of the vehicle to provide an aesthetically pleasing appearance and to enable the vehicle 12 equipped with the outrigger assembly 10 to manipulate in traffic and other types of spaces since the overall width of the vehicle is not greatly increased by the additional of the outrigger assembly 10.

Considering now the side wheel sub-assemblies in greater detail, with reference to FIGS. 2 and 3 of the drawings, the left wheel sub-assembly 26 will be discussed in greater detail, since the left and right sub-assemblies 26 and 28 are similar to one another and there is no need to describe the right wheel sub-assembly 28 in any greater detail. The left wheel sub-assembly 26 includes an inner mounting plate 57 which is best seen in FIG. 3 of the drawings and which is fixed by any suitable technique to the frame 14, such as by the welds 59.

An elongated outer mounting plate 61 is fixed to the inner mounting 57 by means of any suitable fastening means as the nuts and bolts 63. By employing both the inner and outer mounting plates 57 and 61, shims (not shown) can be interposed therebetween, if necessary, for aligning the sub-assembly 26 relative to the vehicle 12 and the ground. The front end portion of the outer mounting plate 61 is of a similar size and shape as the inner mounting plate 57 as shown by the dotted lines and the broken away portion of the outer mounting plate shown in FIG. 2 of the drawings. The rear end portion of the outer mounting plate 61 extends rearwardly beyond the inner mounting plate 57 to support the shock absorber 52, which is positioned above the exhaust pipe 20, as shown in FIG. 2 of the drawings. Also, the link 45 is pivotally attached at 49 to the rear end portion of the outer mounting plate 61. An elongated opening 65 in the rear end portion of the outer mounting plate 61 serves to reduce the overall weight of the left wheel sub-assembly 26.

An elongated adjustment slot 67 in the rear end portion of the outer mounting plate 61 receives a connection 69 for the rear end portion of the shock absorber 52 to secure the shock absorber 52 to the outer mounting plate 61.

In order to make the left side wheel sub-assembly 26 compact in size, the configuration of the piston cylinder assembly 39, the link 45 and the shock absorber 52 is in a Z shape. In this regard, the piston cylinder assembly 39 extends in a substantially parallel spaced apart manner above the shock absorber 52, and the link 45 extends transversely downwardly from its upper end at the pivot connection 47 to its lower end at the pivotal connection 50 at the front end of the shock absorber 52. Thus, in accordance with the present invention, the novel Z configuration eliminates the necessity of positioning the shock absorber 52 in line with the cylinder assembly 39 and thus extending outwardly and upwardly beyond the piston cylinder 39. With the Z configuration, the entire left wheel sub-assembly 26 fits compactly in a small space substantially in a vertical plane closely adjacent the frame 14. With such a compact structure, the side wheel outrigger assembly 10 provides for excellent rolling moment of inertia, since the bulk of the weight of the sub-assemblies 26 and 28 are disposed close to the frame 14 of the vehicle 12. Should these weights be disposed further out from the frame of the vehicle 10, the sub-assemblies would be subjected to undue and unwanted stresses which could cause fracturing or bending of the sub-assemblies.

In order to enable the left wheel sub-assembly 26, as well as the right wheel assembly 28, to be able to fold upwardly and inwardly when not in use, a wing plate 72 is hingedly connected at 74 and 76 to the arm 31 and extends outwardly therefrom in a perpendicular direction relative thereto. Thus, the entire strut unit 35, of which the wing plate 32 forms a part, can swing upwardly and inwardly to the phantom line position as shown in FIG. 2 of the drawings. In that position, the auxiliary side wheel 27 is designated as 27B, together with the corresponding other parts, such as the strut unit 35B. In that position, the wing plate is disposed adjacent the cylinder assembly 39. When the sub-assemblies 26 and 28 are folded in their upper positions, as indicated in FIG. 2 of the drawings, they may be held in place by any suitable technique, such as by securing the two strut units together by fastening means (not shown).

In order to fix the wing plate 72 to the arm 31 as shown in the solid lines in FIG. 2 of the drawings, a pair of bifurcated or clevice supports in the form of two pairs of support plates 78 and 80, and also 82 and 84, for receiving a pair of depending tongue members or plates 86 and 88, the pairs of support plates being fixed to and extending outwardly from the arm 31 and the tongue members being fixed to and depending from the underside of the wing plate 72. Suitable fastening means, such as the nuts and bolts 92 and 94, fasten the tongue members to the clevice supports as best in FIG. 2 of the drawings. In order to fold up the strut unit 35, the nuts and bolts 92 and 94 are removed to free the plate 72 to swing upwardly into a vertical disposition as indicated in phantom lines in FIG. 2 of the drawings.

considering now the strut unit 35 in greater detail, with reference to FIGS. 2 and 3 of the drawings, the strut unit 35 includes a pair of strut rods or bars 95 and 96 which are fixed at their upper ends to the wing plate 72 by means of the respective connecting plates 97 and 98 by any suitable technique such as welding and then grinding down the welds for aesthetic purposes.

A pair of gusset plates 99 and 100 are disposed at the lower ends of the strut rods 95 and 96 which are secured to the axle 37 of the auxiliary side wheel 27.

Considering now in greater detail the hydraulic latching system 54 with reference to FIG. 5 of the drawing, the system 54 includes a pair of left and right valves 101 and 103 which latch the respective left and right piston cylinder assemblies 39 and 55. In this regard, either the right or the left piston cylinder assembly can be latched, or both the piston cylinder assemblies can be latched simultaneously for slow speed or standstill operation. Also, the valves 101 and 103 can both remain open to unlatch both the right and left piston cylinder assemblies. Thus, when the vehicle 12 turns right, the right valve 103 is closed to latch the right piston cylinder assembly 109 and similarly, when the vehicle 12 turns left, the valve 101 latches the assembly 39.

A pair of return springs 105 and 107 bias the respective piston rods 41 and 109 into retracted positions to assist them in returning to their retracted dispositions following movement of the arms, such as the arm 31. A pair of right and left pistons 111 and 113 are fixed to the intermediate portions of the respective left and right piston rods 41 and 109 within the respective left and right cylinders 115 and 117.

A pair of left and right reservoirs 119 and 120 are used for replenishing the hydraulic fluid in the respective left and right cylinders 115 and 117.

A bypass conduit 122 connects in fluid communication the rear end portion of the interior of the piston cylinder 115 at one side of the piston 111 with one port of the left valve 101 and similarly a bypass conduit 124 connects the opposite front and interior portion of the cylinder 115 with the other port valve 101. Thus, when the valve 101 is open, both the front and rear interior portions of the cylinder 115 at opposite sides of the piston 111 are connected in fluid communication to enable the piston 111 and its rod 41 to move freely within the cylinder 115, the bottom end of the rod 41 being pivotally attached to the arm 31. When the valve 101 is closed, the piston 111 is no longer free to move within its cylinder 116 to latch the rod 41 and thus the arm 31 in position.

Similarly, a bypass conduit 126 connects in fluid communication the interior of the rear end portion of the cylinder 117 with one side of the valve 103, and a bypass conduit 128 connects in fluid communication the opposite side of the valve 103 with the front and interior portion of the cylinder 117 at the opposite side of the piston 113. Thus, when the valve 103 is open, the piston 113 is free to move within the cylinder 117, and, when the valve 103 is closed, the piston 113 and its rod 109 is fixed into position.

A snub conduit 130 interconnects in fluid communication the front end interior portion of the cylinder 115 and 117. Thus, when the vehicle 10 is traveling in its vertical disposition, as shown in solid lines in FIG. 1 and 2 of the drawings, and one of the side wheels, such as the side wheel 27, encounter an obstacle, the piston rod, such as the piston rod 41, moves extensively outwardly, which in turn applies fluidic pressure via the snub conduit 130 to the right cylinder 117 to apply pressure to the piston 113, thereby causing the right wheel sub-assembly 28 to stiffen and thus help support the vehicle 10 on the side opposite the one encountering the obstacle.

It should now be understood that the strut units extend outwardly and backwardly at an angle of approximately 45° so as to provide sufficient support when the cylinder assemblies are latched for the vehicle. Also, when the piston cylinder assemblies are unlatched, the side wheels are able to roll backwardly and outwardly during a turn of the vehcile. Thus, as indicated in FIG. 4 of the drawings, the wheel 27 tilts at the same angle as the rear wheel 18 to assume a proper attitude so that castering is not necessary and the side wheel 27 does not skid during a turn. Thus, with the outrigger assembly 10 of the present invention, the auxiliary side wheels move during the unlatched condition of the piston cylinder assemblies are free to move in both an upward and outward outward direction. As a result, during the free condition, when the vehicle 12 is moving and the side wheels encounter obstacles, a great amount of freedom and shock absorption is provided.

The side wheels sub-assemblies mounted on opposite sides at the rear end portion of the vehicle 12 with the side wheels 27 and 29 disposed in alignment with the rear wheel 18. However, it is to be understood that the side wheel sub-assemblies can be fixed to any convenient location on the frame 14. For example, in order to provide an even greater amount of stability for the vehicle 12, the side wheels 27 and 29 may be positioned in the phantom line showing in FIG. 1 at 27 prime and 29 prime.

What is claimed is:

1. In a vehicle having frame means rollably supported on a pair of front and rear wheels in line with one another and motive means for propelling the vehicle along the ground, a side wheel outrigger assembly, comprising:

a pair of right and left mounting means attached rigidly to opposite sides of said frame means;
 a pair of right and left arms pivotally connected to the respective mounting means;
 a pair of right and left struts fixed to the respective ones of said arms extending outwardly and rearwardly therefrom;
 a pair of right and left wheel means rotatably mounted on the respective right and left struts;
 a pair of right and left piston cylinder assemblies having respective right and left cylinder housings mounted pivotally on the respective ones of said mounting means and having respective right and left piston rods pivotally connected to the respective ones of said arms for latching releasably said arms to connect rigidly and releasably said struts and said wheel means in position, said piston rods having right and left pistons slidably mounted within the respective ones of said cylinders;
 right by-pass conduit means connecting in fluid communication the interior of said right cylinder housing between the opposite sides of the right piston disposed therein for enabling said right piston head to move within its cylinder during normal operation of the vehicle to permit in turn the right wheel means to follow freely the contours of the ground over which the vehicle is moving and to absorb impacts encountered by said right wheel means;
 left by-pass conduit means connecting in fluid communication the interior of said left cylinder housing between the opposite sides of the left piston disposed therein for enabling said left piston to move within its cylinder during normal operation of the vehicle to permit in turn the left wheel means to follow freely the contours of the ground over which the vehicle is moving and to absorb impacts encountered by said left wheel means; and
 valve means connected in fluid communication with said conduit means for interrupting selectively the fluid communication between opposite sides of a selected one of said right and left cylinder assemblies to prevent the selected arm from moving and for preventing in turn its wheel means and its struts from moving relative to its mounting means.

2. A side wheel outrigger assembly according to claim 1, further including a pair of right and left transversely extending links pivotally connected intermediate their ends to the respective ones of said right and left mounting means, one of the ends of said links being connected pivotally to the rear ends of the respective ones of said right and left ones of said piston cylinder assemblies, a pair of right and left shock absorbers attached to the respective ones of said right and left mounting means spaced from and disposed opposite the respective right and left cylinder assemblies for cushioning impacts to the other ends of said right and left links respectively.

3. A side wheel outrigger assembly according to claim 1, wherein each one of said right and left mounting means includes a vertical mounting plate and an outwardly extending plate swingably connected to said vertical plate to enable its wheel means to be positioned adjustably upwardly and inwardly, attaching means for connecting together releasably said vertical plate and said outwardly extending plate.

4. A side wheel outrigger assembly according to claim 3, wherein each one of said right and left mounting means further at least one bifurcated support means fixed to one of the vertical plates and the outwardly extending plate, and a tongue plate fixed to the other one of said vertical plates and the outwardly extending plate for being received by said bifurcated means, said attaching means fixing releasably said tongue plate to said bifurcated means.

5. A side wheel outrigger assembly according to claim 3, wherein each one of said right and left struts includes a pair of first and second strut rods fixed at their upper ends to its outwardly extending plate and at their lower ends to its wheel means, further including gusset means fixed to the lower ends of said rods.

6. A side wheel outrigger assembly according to claim 1, further including snub conduit means interconnecting in fluid communication said piston cylinder assemblies at the forward ends of said cylinder housings where their piston rods are connected to the arms.

7. A side wheel outrigger assembly according to claim 1, wherein said valve means includes a pair of right and left valves, each one of said right and left conduit means including a pair of conduits each connected in fluid communication with its valve which when closed, interrupts fluid flow therethrough.

8. A side wheel outrigger assembly according to claim 1, further including a pair of right and left shock absorber means connected to the respective right and left arms for cushioning impacts to the respective right and left wheel means, each one of said right and left absorber means including a link pivotally connected at one of its ends to its arm, and a shock absorber mounted on its mounting means for absorbing impacts to the opposite end of its link, said shock absorber extending substantially parallel to and disposed opposite its piston cylinder assembly, said link extending diagonally between said shock absorber and its piston cylinder assembly to form a Z-shaped configuration.

9. A side wheel outrigger assembly according to claim 1, wherein each one of said right and left mounting means includes a pair of inner and outer plates fixed to one another for receiving shims for adjustment purposes, said inner plate being fixed to said frame means.

10. A side wheel outrigger assembly according to claim 1, wherein each one of said right and left struts extending backwardly and downwardly at 45 degrees.

* * * * *